United States Patent
Jurzitza

(10) Patent No.: US 9,423,291 B2
(45) Date of Patent: Aug. 23, 2016

(54) METHOD FOR CALCULATING THE OSCILLATION AMPLITUDE OF A SONOTRODE

(75) Inventor: Dieter Jurzitza, Karlruhe (DE)

(73) Assignee: Herrmann Ultraschalltechnik GmbH & Co. KG, Karlsbad (DE)

(*) Notice: Subject to any disclaimer, the term of this patent is extended or adjusted under 35 U.S.C. 154(b) by 249 days.

(21) Appl. No.: 14/130,366

(22) PCT Filed: Jul. 23, 2012

(86) PCT No.: PCT/EP2012/064382
§ 371 (c)(1),
(2), (4) Date: Feb. 20, 2014

(87) PCT Pub. No.: WO2013/017452
PCT Pub. Date: Feb. 7, 2013

(65) Prior Publication Data
US 2014/0157899 A1     Jun. 12, 2014

(30) Foreign Application Priority Data
Jul. 29, 2011 (DE) .................. 10 2011 052 283

(51) Int. Cl.
*G01H 11/06* (2006.01)
*B06B 1/02* (2006.01)

(52) U.S. Cl.
CPC .............. *G01H 11/06* (2013.01); *B06B 1/0261* (2013.01)

(58) Field of Classification Search
CPC ..................... G01H 11/06; B06B 1/0261
USPC ............................................................ 73/579
See application file for complete search history.

(56) References Cited

U.S. PATENT DOCUMENTS

| 6,752,886 B2 * | 6/2004 | Distel | B23K 20/10 156/368 |
| 7,966,885 B2 * | 6/2011 | Bayer | B06B 1/0629 73/662 |

(Continued)

FOREIGN PATENT DOCUMENTS

| DE | 102010004468 | * | 7/2011 |
| EP | 1 190 804 A1 | | 3/2002 |
| EP | 1 738 837 A2 | | 1/2007 |

(Continued)

*Primary Examiner* — J M Saint Surin
(74) *Attorney, Agent, or Firm* — Paul & Paul

(57) ABSTRACT

The present invention relates to a method for determining the oscillation amplitude of a sonotrode excited by a converter, wherein the converter is connected to a current generator and the current $I_E(t)$ provided by the current generator and flowing through the converter is measured. According to the invention, in order to provide a method for determining the oscillation amplitude of a sonotrode excited by a converter, the voltage $U_E(t)$ applied to the converter by the current generator is measured and the oscillation amplitude of the sonotorode or a field quantity of the electrical oscillation system comprising the current generator and the converter, said field quantity being related to the oscillation amplitude of the sonotrode, is calculated from the measured voltage $U_E(t)$ and from the measured current $I_E(t)$.

12 Claims, 1 Drawing Sheet

Converter

(56) References Cited

U.S. PATENT DOCUMENTS

| | | | |
|---|---|---|---|
| 8,702,883 B2 * | 4/2014 | Herrmann | B29C 66/93431 156/64 |
| 2006/0144902 A1 | 7/2006 | Pochardt et al. | |
| 2009/0013786 A1 * | 1/2009 | Gassert | B29C 65/08 73/579 |
| 2014/0020816 A1 * | 1/2014 | Herrmann | B29C 66/93431 156/73.1 |

FOREIGN PATENT DOCUMENTS

| | | |
|---|---|---|
| EP | 2 011 577 A2 | 1/2007 |
| EP | 2 151 283 A1 | 2/2010 |

* cited by examiner

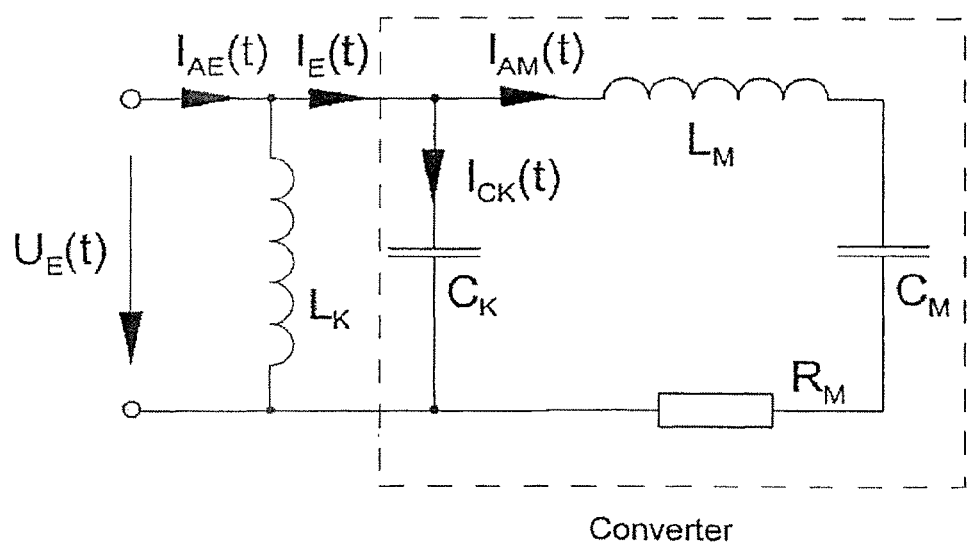
Converter

METHOD FOR CALCULATING THE OSCILLATION AMPLITUDE OF A SONOTRODE

The present invention concerns a method of determining the vibration amplitude of a sonotrode excited by a converter.

In ultrasonic welding or ultrasonic cutting a sonotrode equipped with a welding or cutting surface is generally subjected to the effect of an ultrasonic vibration and moved for the welding or cutting operation towards a counterpart tool so that the material to be welded or cut is guided between the sonotrode on the one hand and the counterpart tool on the other hand.

To cause the sonotrode to vibrate it is connected to a converter optionally by way of an amplitude transformer. The converter converts the electric ac voltage applied thereto into a mechanical vibration. The amplitude transformer which is possibly interposed changes the amplitude without however altering the frequency of the vibration. A current generator, also referred to as the generator, is connected to the converter and generates an electric ac voltage. To transmit a not inconsiderable amount of energy from the sonotrode to the workpiece to be processed it is necessary for the ultrasonic vibration unit comprising the converter, the sonotrode and optionally the amplitude transformer to be excited with the natural frequency relevant to the welding operation so that a standing ultrasound wave is formed within the ultrasonic vibration unit. Therefore the generator is adapted to the ultrasonic vibration system so that it provides the ac voltage at the desired natural frequency.

Generally the generator used is one whose frequency can be adjusted within a narrow frequency band, for example between 19.7 kHz and 20.3 kHz.

For adjusting the generator the ultrasonic vibration unit to be excited is then acted upon with voltages at different frequencies in succession and the respective vibration amplitude of the sonotrode is measured. The excitation frequency which causes the nominal vibration amplitude of the sonotrode is the working frequency.

To measure the vibration amplitude of the sonotrode it is usual for an electric signal proportional to the mechanical amplitude of the sonotrode to be derived by way of a measurement of the current which flows into a parallel circuit comprising converter and a coil $L_K$.

An equivalent circuit diagram is shown in FIG. 1. The voltage $U_E(t)$ generated by the generator is applied at the input of the converter. The magnitude of that voltage depends both on the current generator, for example its internal resistance, and also on the ohmic, capacitive and inductive resistances of the converter.

It will be seen from FIG. 1 that the converter comprises a series circuit of a coil of inductance $L_M$, a capacitor of capacitance $C_M$ and an ohmic resistance $R_M$, wherein a converter capacitance $C_K$ is connected in parallel therewith.

The consequence of this is that the current $I_E(t)$ flowing into the converter is divided into the current $I_{AM}(t)$ which generates the actual vibration and the current $I_{CK}(t)$ into the converter capacitance. The converter capacitance $C_K$ is dependent on the structure of the converter. It can be ascertained from measurements. That can be effected for example by recording and evaluating an impedance curve.

Usually a coil $L_K$ is connected in parallel with the converter, the coil being so dimensioned that at the desired operating frequency (for example 20 kHz), this gives a resonance circuit with the converter capacitance $C_K$, which compensates for the reactive current $I_{CK}(t)$ of the capacitor $C_K$. That measure provides that the residence circuit operates as a blocking circuit so that as a result no current flows through the blocking circuit and the current $I_{AE}(t)$ from the generator is identical to the current $I_{AM}(t)$ through the coil $L_M$. Direct measurement of the amplitude current $I_{AE}$ is therefore possible, wherein the amplitude current $I_{AE}(t)$ for a fixed frequency with sinusoidal excitation is proportional to the speed of the sonotrode vibration.

In the resonance situation therefore the current $I_{AE}(t)$ differs from the current $I_E(t)$ flowing into the converter by the compensation current $I_{CK}(t)$ provided by way of the coil $L_K$.

The known procedure is based on the presumption that the current $I_E(t)$ as well as the voltage $U_E(t)$ are sinusoidal or are at least dominated by the fundamental wave. That however applies only in regard to some operating conditions. In general the current $I_E(t)$ is non-linearly distorted. That is because inter glia the sonotrode comes into contact with the material to be processed, during operation, and that distorts the vibration amplitude. In addition at the moment of contact the natural frequency of the vibration configuration is altered, which equally leads to distortion of the vibration amplitude.

In the situation shown in FIG. 1 therefore the parameter $I_{AE}(t)$ only approximately coincides with the current $I_{AM}(t)$. Basically identity occurs only for a simple sinusoidal vibration. As soon as harmonics or other distortions occur deviations arise. The consequence of this is that, particularly with a high harmonic content in the high frequency current $I_E(t)$ the current $I_{AE}(t)$ flowing into the compensation circuit is no longer necessarily proportional to the actual amplitude current $I_{AM}(t)$.

The sonotrode as a λ/2 conductor as well as the amplitude transformation portion transform the non-sinusoidal movement into a movement which is also non-sinusoidal of the ceramic stack in the converter, which in turn is reproduced as a corresponding current signal in the electric system.

The deviation from the sinusoidal curve shape does not cause any problem in regard to the actual welding operation itself. The deviation however falsifies measurement of the mechanical vibration amplitude.

Those non-linear deviations cannot be depicted by the known measurement method. As a result this can involve markedly heightened vibration amplitudes at the ultrasonic vibration system. That can result in the ultrasonic vibration system (converter, optionally amplitude transformation portion and sonotrode) being damaged or even destroyed.

Therefore the object of the present invention is to provide a method of determining the vibration amplitude of a sonotrode excited by a converter, which as far as possible prevents the above-mentioned disadvantages.

According to the invention that object is attained in that the voltage $U_E(t)$ applied to the converter by the current generator and the voltage $I_E(t)$ which is provided by the current generator and which flows through the converter are measured and the vibration amplitude of the sonotrode or a field magnitude of the electric vibration system comprising the current generator and the converter, which field magnitude is related to the vibration amplitude, is calculated therefrom.

Because the vibration amplitude is calculated from the measured current and the measured voltage the parallel circuit of a coil can be eliminated. That not only leads to a simplification in the generator but it also makes it possible for the generator to be used for different ultrasonic vibration systems which are to be excited with different natural frequencies. In the case of the known generators only a very limited adjustability of the excitation frequency is possible as the excitation frequency must always approximately be identical to the resonance frequency of the oscillator circuit formed by the parallel-connected coil and the converter capacitance. That limitation disappears with the method according to the invention as the vibration amplitude of the sonotrode is now calculated. At the best, a field magnitude is calculated, which is proportional to the vibration amplitude of the sonotrode.

In a preferred embodiment the current $I_{CK}(t)$ through the capacitance $C_K$ of the capacitor is calculated from the measured voltage $U_E(t)$, wherein the amplitude current $I_{AM}(t)$ is calculated as: $I_{AM}(t)=I_E(t)-I_{CK}(t)$. The vibration amplitude of the sonotrode or a field magnitude related to the vibration amplitude is calculated therefrom.

In a further preferred embodiment the current $I_{CK}(t)$ is calculated in that firstly the measured voltage $U_E(t)$ is differentiated in respect of time and the result is then multiplied by the capacitance of the converter $C_K$:

$$I_{CK}(t) = \frac{dU_E(t)}{dt} \cdot C_K$$

The amplitude current $I_{AM}(t)$ proportional to the speed of the sonotrode vibration can thus be determined by simple subtraction of the calculated capacitor current $I_{CK}(t)$ from the measured high frequency current $I_E(t)$.

To calculate the desired amplitude the amplitude current $I_{AM}(t)$ can now be integrated over time. For the specific case of sinusoidal input signals integration is reduced to division by the angular frequency $\omega$. Instead integration can be performed for non-sinusoidal signals. The result of integration is then also multiplied by a proportionality constant C to be determined, in order to calculate the vibration amplitude. The operation of determining the proportionality constant can be performed for example by a one-off measurement of the vibration amplitude and comparison with the calculated value. After the one-off determination of C the instantaneous vibration amplitude of the ultrasonic vibration system can then be calculated by the described method at any time solely from the two measured electric parameters. By means of that method it is also possible to take account of the amplitude-transforming properties of the sonotrode and/or the amplitude transformer.

Further advantages, features and possible uses will be apparent from the description hereinafter of a preferred embodiment.

In a preferred embodiment the sonotrode is connected by way of an amplitude transformer to a converter whose piezoelectric elements convert an ac voltage provided by a current generator into a mechanical vibration. A digital ultrasonic generator is used as the current generator. Both the converter voltage $U_E(t)$ and also the current $I_E(t)$ are detected for example by means of an analog-digital converter continuously but in time-discrete fashion, that is to say at short intervals.

The voltage measured in that way is differentiated in respect of time. Calculation of the derivative of the voltage time function also takes account of the fact that, besides the basic vibration, there are harmonics in the measured current signal $I_E(t)$ or voltage signal $U_E(t)$. The amplitude current $I_{AM}(t)$ is thereby detected with all its spectral components.

The compensation inductance $L_K$ shown in FIG. 1 can moreover be eliminated for that purpose as it is no longer required to form a blocking circuit with the converter capacitance $C_K$. That markedly simplifies the structure of the generator. Moreover upon elimination of the compensation inductance $I_{AE}(t)=I_E(t)$ as the current delivered by the generator flows completely into the converter and the compensation inductance does not make any additional current available.

The derived voltage $$\left(\frac{dU_E(t)}{dt}\right)$$

is then multiplied by the measured capacitance of the converter $C_K$, from which the current $I_{CK}(t)$ is obtained by the capacitance of the converter. The amplitude current $I_{AM}(t)$ is then afforded as $I_{AM}(t)=I_E(t)-I_{CK}(t)$. The amplitude current $I_{AM}(t)$ is then also integrated over time to obtain a signal proportional to the amplitude of the sonotrode vibration.

Unlike the method previously employed no changes to the converter or the generator are necessary if the operating frequency is altered. As the capacitor current is obtained by derivation of the converter voltage and subsequent weighting with a suitable weighting factor that adaptation can be easily achieved by modification of the numerical value for the capacitance $C_K$. It is thus also possible for example to take account of the effects of greater line lengths in relation to the feed line cable, insofar as calculation of the current $I_{CK}(t)$ is based on a correspondingly greater overall capacitance $C_K$.

Thus it is for example conceivable for the ultrasonic system to allow the input of a line length, whereby the numerical value for the capacitance $C_K$ is then suitably automatically adapted so that even with an altered line length a signal is produced, which is proportional to the vibration amplitude of the sonotrode.

The invention claimed is:

1. A method of determining the vibration amplitude of a sonotrode excited by a converter,
   wherein the converter is connected to a current generator, the converter and the current generator comprising an electric vibration system, the current generator applying a measured voltage $U_E(t)$ to the converter and providing a current $I_E(t)$ flowing through the converter, the current $I_E(t)$ flowing through the converter being measured,
   characterised in that the vibration amplitude of the sonotrode or a field magnitude of the electric vibration system comprising the current generator and the converter, which field magnitude is related to the vibration amplitude of the sonotrode, is calculated from the measured voltage $U_E(t)$ and from the measured current $I_E(t)$.

2. A method as set forth in claim 1, the converter having a capacitance $C_K$, a current $I_{CK}(t)$ flowing through the converter capacitance, and an amplitude current $I_{AM}(t)$, the current $I_{CK}(t)$ being calculated by the capacitance $C_K$ of the capacitor, wherein the amplitude current $I_{AM}(t)$ is calculated as $I_{AM}(t)=I_E(t)-I_{CK}(t)$ and that the vibration amplitude of the sonotrode or a field magnitude related to the vibration amplitude is calculated therefrom.

3. A method as set forth in claim 2, the operation of determining the vibration amplitude of the sonotrode being effected by means of integration of the amplitude current $I_{AM}(t)$ over time.

4. A method as set forth in any of claims 1-2, the measured voltage $U_E(t)$ being differentiated in respect of time $$\left(\frac{dU_E(t)}{dt}\right)$$

and the vibration amplitude of the sonotrode or a field magnitude related to the vibration amplitude is calculated therefrom.

5. A method as set forth in claim 4, $$\left(\frac{dU_E(t)}{dt}\right)$$

being multiplied by the capacitance of the converter $C_K$ to calculate the current $I_{CK}(t)$ by the capacitance of the converter, wherein the vibration amplitude of the sonotrode or a field magnitude related to the vibration amplitude is calculated therefrom.

6. A method as set forth in claim 5, the operation of determining the vibration amplitude of the sonotrode being effected by means of integration of the amplitude current $I_{AM}(t)$ over time.

7. A method as set forth in claim 4, the operation of determining the vibration amplitude of the sonotrode being effected by means of integration of the amplitude current $I_{AM}(t)$ over time.

8. A method as set forth in claim 3, the vibration amplitude being effected by integration of the amplitude current $I_{AM}(t)$ over time and multiplication of the result of the integration by a proportionality constant C.

9. A method as set forth in one of claims 1 through 2, the amplitude-transforming properties of the sonotrode or amplitude transformer being taken into consideration by correction factors in amplitude calculation, wherein a signal proportional to the vibration amplitude is calculated and same is multiplied by a proportionality constant to be determined.

10. A method as set forth in one of claims 1 through 2, the calculations being performed numerically.

11. A method as set forth in one of claims 1 through 2, the generator being connected to the converter by way of a cable of the length L and that for the calculation the capacitance of the converter $C_K$ being corrected by a cable correction $C_{cable}$, wherein the value of $C_{cable}$ depends on the length L.

12. A method as set forth in one of claims 1 through 2 wherein:
 i) the capacitance $C_K$ of the converter is measured,
 ii) the current $I_E(t)$ flowing through the converter is measured,
 iii) the voltage $U_E(t)$ applied to the converter is measured,
 iv) the current $I_{CK}$ through the capacitance of the converter by means of the equation $$I_{CK}(t) = \frac{dU_E(t)}{dt} \cdot C_K,$$

is calculated,
 v) the current by means of the equation $I_{AM}(t)=I_E(t)-I_{CK}(t)$, is calculated
 vi) a signal $A_0$ proportional to the vibration amplitude of the sonotrode by $A_0=\int I_{AM}(t)dt$, is calculated, and
 vii) the vibration amplitude $A_{Son}$ of the sonotrode is calculated by the equation $A_{Son}=C\cdot A_0$, wherein C is a proportionality constant to be selected.

* * * * *